United States Patent
Lin (10) Patent No.: US 10,275,187 B2
(45) Date of Patent: Apr. 30, 2019

(54) MEMORY DEVICE AND DATA READ METHOD THEREOF

(71) Applicant: Silicon Motion, Inc., Jhubei (TW)

(72) Inventor: Yu-Chih Lin, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 141 days.

(21) Appl. No.: 15/246,110

(22) Filed: Aug. 24, 2016

(65) Prior Publication Data
US 2017/0083372 A1    Mar. 23, 2017

Related U.S. Application Data

(60) Provisional application No. 62/220,038, filed on Sep. 17, 2015.

(30) Foreign Application Priority Data

Mar. 23, 2016  (TW) .............. 105108937 A (51) Int. Cl.
  *G06F 3/06*  (2006.01)
  *G06F 12/02* (2006.01)

(52) U.S. Cl.
  CPC ............ *G06F 3/0685* (2013.01); *G06F 3/061* (2013.01); *G06F 3/0659* (2013.01);
  (Continued)

(58) Field of Classification Search
  CPC ...... G06F 3/0685; G06F 3/061; G06F 3/0659; G06F 12/0246; G06F 2212/7201; G06F 2212/7203
  See application file for complete search history.

(56) References Cited

U.S. PATENT DOCUMENTS

| | | | |
|---|---|---|---|
| 6,378,059 B1 * | 4/2002 | Miyoshi | G06F 12/10 711/203 |
| 7,873,791 B1 * | 1/2011 | Yu | G06F 12/0862 711/137 |

(Continued)

FOREIGN PATENT DOCUMENTS

| | | |
|---|---|---|
| CN | 103631751 A | 3/2014 |
| CN | 103635968 A | 3/2014 |

(Continued)

OTHER PUBLICATIONS

Office Action of corresponding TW application, published on Dec. 27, 2016.

*Primary Examiner* — Francisco J Aponte
*Assistant Examiner* — Kevin X Lu
(74) *Attorney, Agent, or Firm* — Wang Law Firm, Inc.

(57) ABSTRACT

A memory device is provided. A processor accesses non-volatile memories via channels and generates a status table according to at least one command of a command queue. The status table records a plurality of tasks. Each task corresponds to one read status and one channel number. The processor selects a plurality of specific tasks from the tasks to serve as a first task set and simultaneously performs all the selected specific tasks with different channel numbers. When the read status of a first specific task matches a first predetermined status, the processor retrieves a logical-to-physical address mapping table relating to the logical address of the first specific task. When the read status of the first specific task matches a second predetermined status, the processor retrieves data relating to the logical address of the first specific task.

18 Claims, 4 Drawing Sheets

(52) U.S. Cl.
CPC .. *G06F 12/0246* (2013.01); *G06F 2212/7201* (2013.01); *G06F 2212/7203* (2013.01)

(56) References Cited

U.S. PATENT DOCUMENTS

| | | | |
|---|---|---|---|
| 9,058,208 B2* | 6/2015 | Chang | G06F 9/4881 |
| 2009/0292865 A1 | 11/2009 | Hong | |
| 2010/0262721 A1* | 10/2010 | Asnaashari | G06F 13/161 |
| | | | 710/5 |
| 2013/0275682 A1* | 10/2013 | Ramanujan | G06F 13/1684 |
| | | | 711/122 |

FOREIGN PATENT DOCUMENTS

| | | |
|---|---|---|
| TW | 201104440 A | 2/2011 |
| TW | 201303591 A | 1/2013 |
| TW | 201329857 A | 7/2013 |

\* cited by examiner

FIG. 1

| Task | Read status | Channel number |
|---|---|---|
| 1 | a | ? |
| 2 | a | ? |
| 3 | a | ? |
| 4 | a | ? |
| 5 | a | ? |
| 6 | a | ? |
| 7 | a | ? |
| 8 | a | ? |

FIG. 2

| Task | Read status | Channel number |
|---|---|---|
| 1 | c | 2 |
| 2 | c | 3 |
| 3 | d | 2 |
| 4 | b | 1 |
| 5 | b | 1 |
| 6 | c | 2 |
| 7 | b | 2 |
| 8 | c | 3 |

FIG. 4

| Task | Read status | Channel number |
|---|---|---|
| 1 | b | 0 |
| 2 | b | 1 |
| 3 | c | 2 |
| 4 | b | 1 |
| 5 | b | 1 |
| 6 | c | 2 |
| 7 | b | 2 |
| 8 | c | 3 |

MEMORY DEVICE AND DATA READ METHOD THEREOF

CROSS REFERENCE TO RELATED APPLICATIONS

This application claims the benefit of U.S. Provisional Application No. 62/220,038 filed Sep. 17, 2015, which application is hereby incorporated by reference in its entirety.

This Application claims priority of Taiwan Patent Application No. 105108937, filed on Mar. 23, 2016, the entirety of which is incorporated by reference herein.

BACKGROUND OF THE INVENTION

Field of the Invention

The invention relates to a memory device, and more particularly to a memory device that performs read operations according to read statuses in a status table.

Description of the Related Art

Memories are divided into volatile memories and non-volatile memories. Non-volatile memories can keep data stored therein when power supplied to the non-volatile memories is turned off. Volatile memories keep data stored therein when power supplied to the non-volatile memories is turned on. A memory is often installed in a memory device which stores data for a host. For example, a memory device comprises a controller and at least one memory. The memory of the memory device is for data storage, and the controller of the memory device accesses data stored in the memory according to commands sent from a host.

BRIEF SUMMARY OF THE INVENTION

In accordance with an embodiment, a memory device comprises a plurality of non-volatile memories, a volatile memory, and a processor. The volatile memory comprises a command queue. The processor accesses the non-volatile memories via a plurality of channels and generates a status table according to at least one command of the command queue. The status table records a plurality of tasks, a plurality of read statuses, and a plurality of channel numbers. Each task corresponds to one read status and one channel number. The processor selects a plurality of specific tasks among the tasks to serve as a first task set and simultaneously performs all the specific tasks of the first task set. The channel numbers corresponding to the specific tasks of the first task set are different. When the read status of a first specific task of the first task set matches a first predetermined status, the processor reads one of the non-volatile memories to retrieve a logical-to-physical address mapping table relating to a logical address of the first specific task. When the read status in the first specific task matches a second predetermined status, the processor reads one of the non-volatile memories to retrieve data relating to the logical address of the first specific task.

A data read method for a memory device is provided. The memory device comprises a plurality of non-volatile memories and a processor. The processor reads the non-volatile memories via a plurality of channels. An exemplary embodiment of the data read method is described in the following. A status table is generated according to at least one command of a command queue. The status table records a plurality of tasks, a plurality of read statuses, and a plurality of channel numbers. Each task corresponds to one read status and one channel number. A plurality of specific tasks among the tasks are selected to serve as a first task set. All the specific tasks of the first task set are performed simultaneously. The channel numbers of all the specific tasks of the first task set are different. At least one of the non-volatile memories is read to retrieve a logical-to-physical address mapping table relating to a logical address of a first specific task among the first task set when the read status of the first specific task matches a first predetermined status. At least one of the non-volatile memories is read to retrieve data relating to the logical address of the first specific task when the read status of the first specific task matches a second predetermined status.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
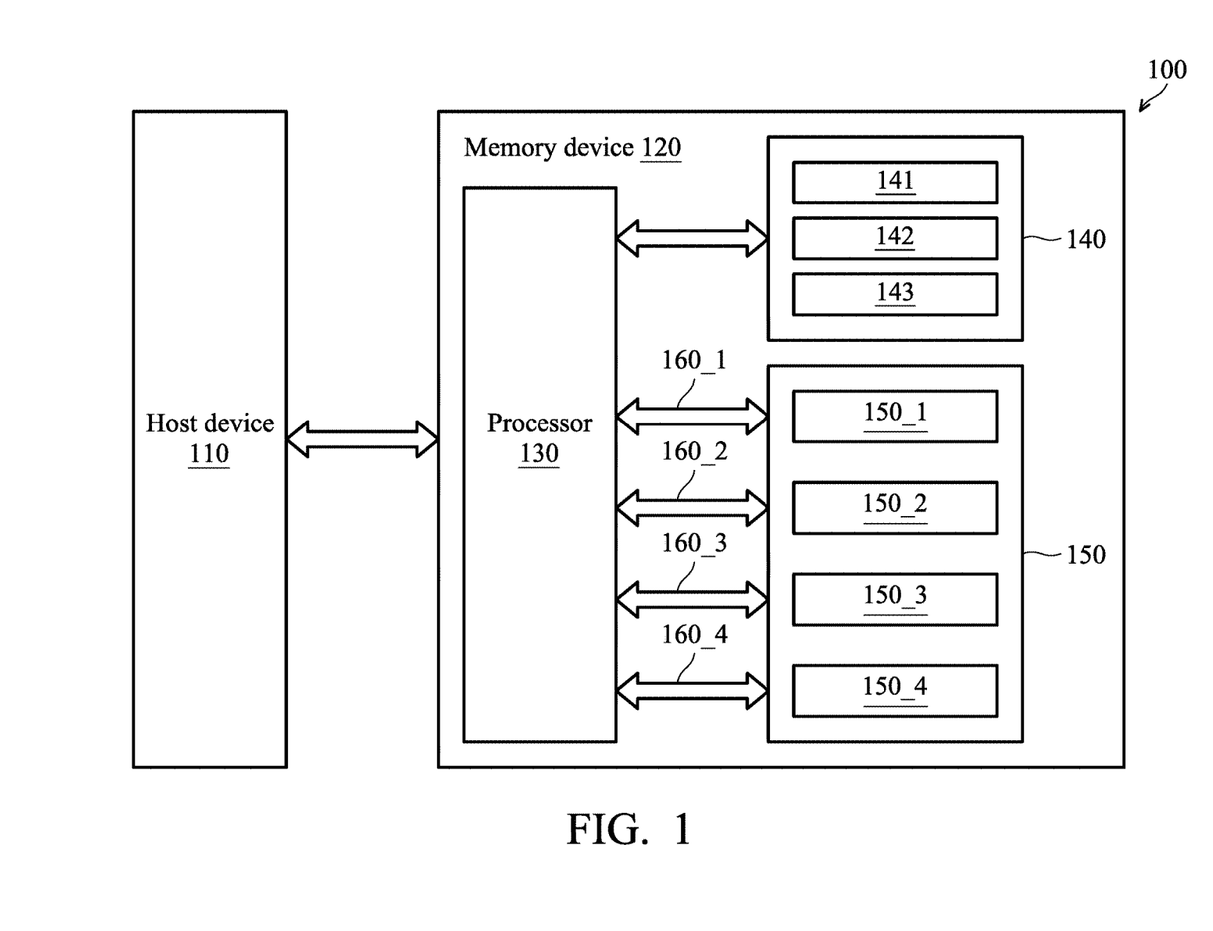
FIG. 1 is a schematic diagram of an exemplary embodiment of an access system, according to various aspects of the present disclosure.

FIG. 1 is a schematic diagram of an exemplary embodiment of an access system, according to various aspects of the present disclosure. The access system 100 comprises a host device 110 and a memory device 120. When the host device 110 sends write commands, the memory device 120 stores data according to the write commands. When the host device 110 sends read commands, the memory device 120 provides data to the host device 110 according to the read commands. In this embodiment, the memory device 120 comprises a processor 130, a volatile memory 140, and a non-volatile storage unit 150.

The processor 130 receives various commands sent from the host device 110 and sequentially stores the commands in a command queue of the volatile memory 140. For brevity, assume that the volatile memory 140 comprises a block 141 configured to serve as a command queue. In this embodiment, the processor 130 establishes a statue table according to at least one command of the command queue. In one embodiment, the status table is stored in the block 142 of the volatile memory 140, but the disclosure is not limited thereto. In other embodiments, the status table may store in another memory, such as the non-volatile storage unit 150 or other memories. The information recorded in the status table is described in greater detail below.

In one embodiment, the volatile memory 140 comprises a block 143 configured to store a logical-to-physical address mapping table. The logical-to-physical address mapping table records a plurality of logical address and a plurality of physical address. Each physical address relates to one logical address. The processor 130 utilizes the logical-to-physical address mapping table to determine which non-volatile memory in the non-volatile storage unit 150 data of the logical address provided by the host device 110 is physically stored in.

In some embodiments, the volatile memory 140 further stores a mapping address table to indicate which non-volatile memory in the non-volatile storage unit 150 a specific logical-to-physical address mapping table of the logical address provided by the host device 110 is physically stored in. For example, when the processor 130 cannot retrieve a physical address corresponding to a logical address provided by the host device 110 from a first logical-to-physical address mapping table stored in the volatile memory 140, the processor 130 retrieves a mapping address table stored in the volatile memory 140 to determine which non-volatile memory of the non-volatile storage unit 150 contains a second logical-to-physical address mapping table corresponding to the logical address provided by the host device 110. The processor 130 loads the second logical-to-physical address mapping table to the volatile memory 140. Then, the processor 130 reads the second logical-to-physical address mapping table stored in the volatile memory 140 to determine which location in the non-volatile storage unit 150 data corresponding to the logical address provided by the host device 110 is physically stored in.

The volatile memory 140 may be a dynamic random access memory (DRAM) or a static random access memory (SDRAM), but the disclosure is not limited thereto. In other embodiments, the volatile memory 140 may be other kinds of volatile memories. In one embodiment, the processor 130 and the volatile memory 140 can be integrated into a controller, which accesses the non-volatile storage unit 150 according to the commands from the host device 110.

The non-volatile storage unit 150 can be a NAND flash memory. As shown in FIG. 1, the non-volatile storage unit 150 comprises non-volatile memories 150_1~150_4, but the disclosure is not limited thereto. In other embodiments, the non-volatile storage unit 150 comprises any suitable number of non-volatile memories. In this embodiment, the processor 130 accesses different non-volatile memories via different channels. For example, the processor 130 accesses the non-volatile memory 150_1 via the channel 160_1, accesses the non-volatile memory 150_2 via the channel 160_2, accesses the non-volatile memory 150_3 via the channel 160_3, and accesses the non-volatile memory 150_4 via the channel 160_4. In one embodiment, the non-volatile memories 150_1~150_4 store data and a plurality of logical-to-physical address mapping tables. In this embodiment, the processor 130 reads and outputs data stored in the non-volatile memories 150_1~150_4 to the host device 110, and does not output the logical-to-physical address mapping tables to the host device 110.

Figure 2:
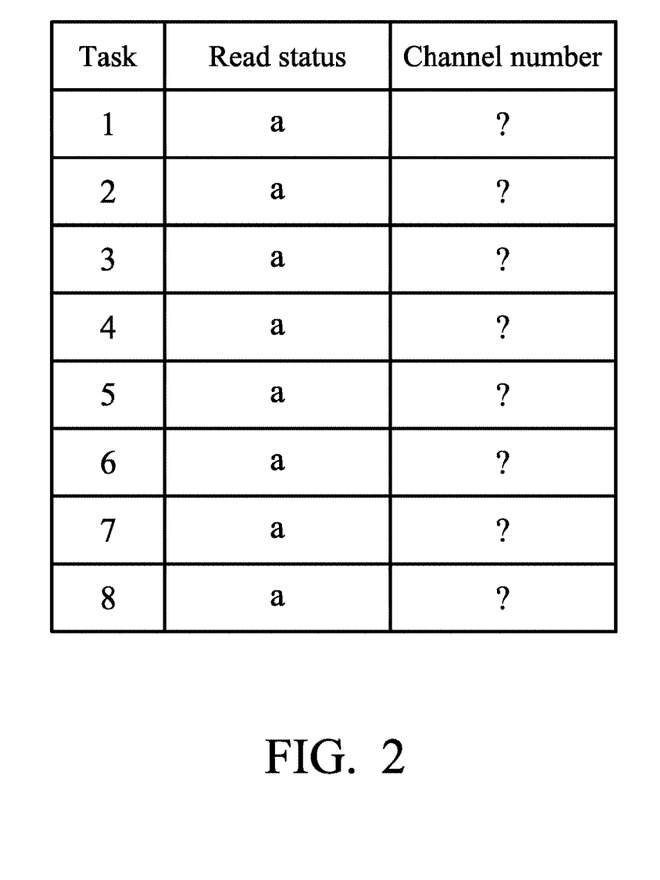
FIG. 2 is a schematic diagram of an exemplary embodiment of an initial status table, according to various aspects of the present disclosure.

FIG. 2 is a schematic diagram of an exemplary embodiment of an initial status table, according to various aspects of the present disclosure. The status table records a plurality of tasks, a plurality of read statuses, and a plurality of channel numbers. Each task corresponds to a read status and a channel number indicating which channel is utilized to perform the corresponding task. For brevity, the status table shown in FIG. 2 only shows eight tasks, but the disclosure is not limited thereto. In other embodiments, the status table records another number of tasks.

In one embodiment, the processor 130 obtains the tasks 1~8 according to at least one command stored in a command queue of the volatile memory 140 and generates a status table according to the tasks 1~8. The processor 130 initializes the read statuses of the tasks 1~8. In this embodiment, the processor 130 initializes the read status of each of the tasks 1~8 to an initial status a. Since the processor 130 does not recognize which channel can be utilized to access a corresponding non-volatile memory, each of the channel numbers corresponding to the tasks 1~8 in the status table is labeled by a question mark.

Figure 3:
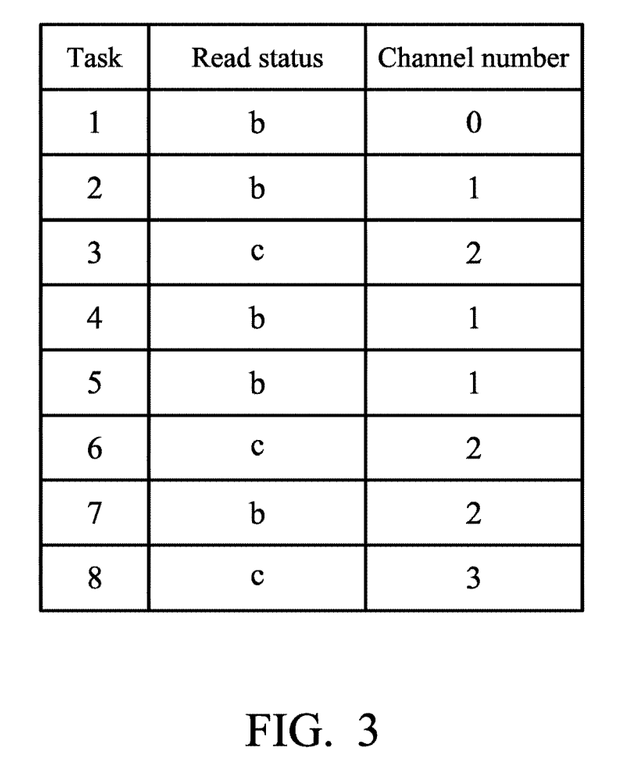
FIG. 3 is a schematic diagram of an exemplary embodiment of an updated status table, according to various aspects of the present disclosure.

Then, the processor 130 encodes the tasks 1~8 to obtain the logical addresses of the tasks 1~8 and updates the read statuses and the channel numbers of the tasks 1~8 according to the logical addresses of the tasks 1~8 and information stored in the volatile memory 140. FIG. 3 is a schematic diagram of an exemplary embodiment of an updated status table, according to various aspects of the present disclosure. Taking the task 1 as an example, assume that the logical address of the task 1 is not recorded in the logical-to-physical address mapping table stored in the volatile memory 140. Therefore, the processor 130 updates the read status of the task 1 from the initial status a to a first specific status b. The first specific status b indicates that the processor 130 needs to first determine which non-volatile memory stores a specific logical-to-physical address mapping table corresponding to the logical address of the task 1. Then, the processor 130 utilizes the specific logical-to-physical address mapping table to determine which location in the non-volatile memories data of the logical address corresponding to the task 1 is physically stored in.

For example, during a read period, the processor 130 determines that a specific logical-to-physical address mapping table corresponding to the logical address of the task 1 is stored in the non-volatile memory 150_1 according to a mapping address table stored in the volatile memory 140. Since the processor 130 utilizes the channel 160_1 to access the non-volatile memory 150_1, the processor 130 sets the channel number corresponding to the task 1 to 0.

Referring to FIG. 3, assume that the logical address of the task 3 has been recorded in the logical-to-physical address mapping table stored in the volatile memory 140. In this case, the processor 130 sets the read status of the task 3 to a second specific status c. Since the data corresponding to the logical address of the task 3 is stored in the non-volatile memory 150_3, the processor 130 updates the channel number of the task 3 to 2. In this embodiment, the channel numbers 0~3 represent the channels 160_1~160_4, respectively.

After the processor 130 updates all read statuses and all channel numbers of all tasks, the processor 130 selects many tasks to serve as a first task set from the updated status table shown in FIG. 3 and simultaneously performs all tasks of the first task set. In this embodiment, the channel numbers of all the tasks in the first task set are different.

For example, the tasks 1-3 and 8 have different channel numbers such that the processor 130 may select the tasks 1-3 and 8 to serve as a first task set. In this case, at least one read status of the tasks 1-3 and 8 is different from another read status of the tasks 1-3 and 8. In another embodiment, the processor 130 selects tasks whose read statuses are the same and channel numbers are different. For example, the processor 130 selects the tasks 1-2 and 7 to serve as a first task set or selects the tasks 3 and 8 to serve as a first task set. In other embodiments, the processor 130 selects tasks according to the channel numbers such that each of the channels 160_1~160_4 is utilized and operates in a busy state. In other words, during each read period, the processor 130 reads the non-volatile memories 150_1~150_4 via the channels 160_1~160_4.

Figure 4:
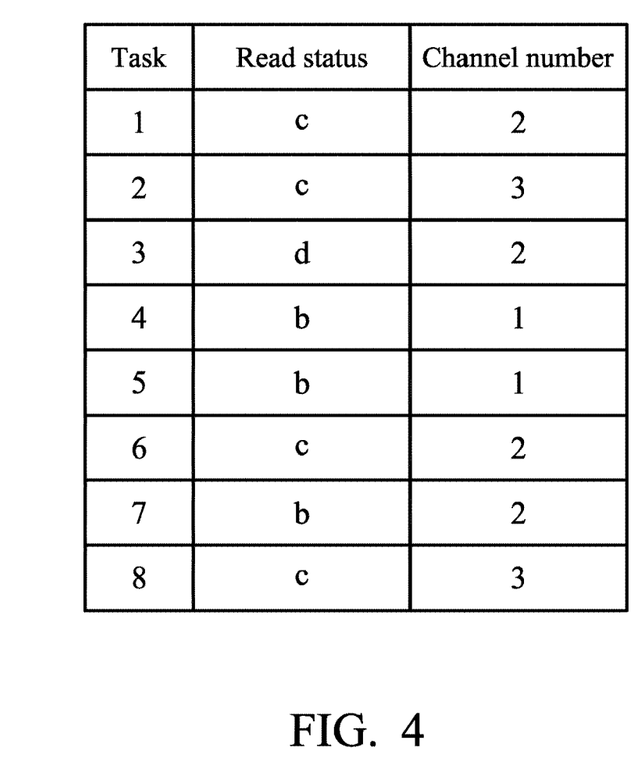
FIG. 4 is a schematic diagram of another exemplary embodiment of an updated status table, according to various aspects of the present disclosure.

For brevity, assume that the processor 130 selects the tasks 1-3 to serve as a first task set. In this case, the processor 130 utilizes the channels 160_1~160_3 according to the channel numbers of the tasks 1-3 to simultaneously access the non-volatile memories 150_1~150_3. Taking the task 1 as an example, since the read status of the task 1 is the first specific status b, the processor 130 accesses the non-volatile memory 150_1 via the channel 160_1 to retrieve a first logical-to-physical address mapping table. After the first logical-to-physical address mapping table has been retrieved by the processor 130, the processor 130 updates the read status of the task 1 from the first specific status b to the second specific status c. In one embodiment, the processor 130 loads the first logical-to-physical address mapping table to the volatile memory 140. The processor 130 utilizes the first logical-to-physical address mapping table to recognize that the data corresponding to the logical address of the task 1 is stored in the non-volatile memory 150_3. Therefore, the processor 130 updates the channel number of the task 1 to 2 as shown in FIG. 4. In one embodiment, when the data corresponding to the logical address of the task 1 is stored in the non-volatile memory 150_1, the processor 130 maintains the channel number of the task 1 at 0.

For task 2, since the channel number of the task 2 is 1, as shown in FIG. 3, the processor 130 utilizes the channel 160_2 to read a second logical-to-physical address mapping table stored in the non-volatile memory 150_2 and updates the read status of the task 2 to the second specific status c as shown in FIG. 4. For the task 3, since the read status of the task 3 is the specific status c, the processor 130 reads data stored in the non-volatile memory 150_3 via the channel 160_3 and updates the read status of the task 3 to a specific status d as shown in FIG. 4. The specific status d indicates that the task 3 has been finished by the processor 130.

In one embodiment, the processor 130 stores the data and the logical-to-physical address mapping table to the volatile memory 140. However, the processor 130 only outputs the data to the host device 110. The processor 130 does not output the logical-to-physical address mapping table to the host device 110.

FIG. 4 is a schematic diagram of another exemplary embodiment of an updated status table, according to various aspects of the present disclosure. As shown in FIG. 4, the read statuses and the channel numbers of the tasks 1-3 are changed. The processor 130 again selects many tasks having different channel numbers from the updated status table shown in FIG. 4. The selected tasks serve as a second task set. In one embodiment, the processor 130 may select the tasks having the same read statuses. For example, the processor 130 may select the tasks 1-2 from the updated status table shown in FIG. 4 as a second task set or select the tasks 4 and 7 from the updated status table shown in FIG. 4 to serve as a second task set. In other embodiments, the processor 130 may select the tasks 1-2 and 5 as a second task set. In this case, the read status of a first task (e.g. the task 1) among the second task set is different from the read status of a second task (e.g. the task 5) among the second task set.

In some embodiments, the read statuses of all tasks of the second task set are the same. The read statuses of the tasks of the second task set may be the same or different from the read statuses of the tasks of the first task set. For example, the read status of each of the tasks of the second task set is the first specific status b, and the read status of each of the tasks of the first task set is the first specific status b or the second specific status c.

The processor 130 performs all the tasks of the second task set and updates the read statuses and the channel numbers of all the tasks of the second task set. Then the processor 130 selects many tasks from the latest updated status table to serve as a third task set until the read status of each of the tasks 1~8 is the specific status d. In one embodiment, when the data relating to the logical addresses of the tasks 1~8 have been retrieved by the processor 130, the processor 130 outputs the data to the host device 110.

Figure 5:
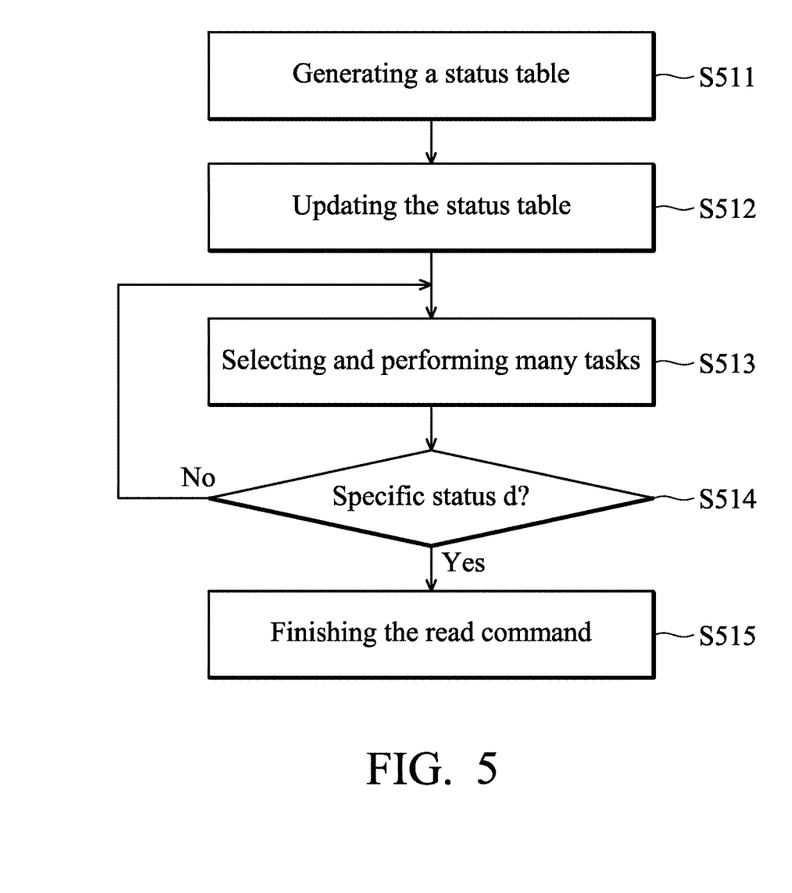
FIG. 5 is a flowchart of an exemplary embodiment of a data read method, according to various aspects of the present disclosure.

FIG. 5 is a flowchart of an exemplary embodiment of a data read method, according to various aspects of the present disclosure. The data read method is applied in a memory device. The memory device comprises a volatile memory, a plurality of non-volatile memories, and a processor. In one embodiment, the processor reads the non-volatile memories via a plurality of channels.

First, the processor generates a status table according to at least one command of a command queue (step S511). In one embodiment, the volatile memory of the memory device has a block configured to serve as a command queue. Additionally, the status table may be stored in the volatile memory, the non-volatile memory, or other memory of the memory device. In this embodiment, the status table records a plurality of tasks. Each task corresponds to a read status and a channel number. After the status table is generated, the processor initializes the read status of each of the tasks of the status table to a specific status, such as an initial status a. FIG. 2 shows an embodiment of the initialized status table.

Next, the processor updates the read status and the channel number of each of the tasks according to information stored in the volatile memory (step S512). Therefore, the read status and the channel number of each of the tasks relate to the information stored in the volatile memory. In one embodiment, the processor determines whether the logical address of a first specific task of the status table is recorded in a logical-to-physical address mapping table stored in the volatile memory.

When the logical address of the first specific task has not been recorded in the logical-to-physical address mapping table stored in the volatile memory, the processor sets the read status of the first specific task to a specific status b and updates the channel number of the first task according to a mapping address table stored in the volatile memory. However, when the logical address of the first specific task has been recorded in the logical-to-physical address mapping table stored in the volatile memory, the processor sets the read status of the first specific task to a specific status c. At this time, the processor updates the channel number of the first task according to the logical-to-physical address mapping table stored in the volatile memory.

Next, the processor selects many tasks from the updated status table and simultaneously performs all the selected tasks (step S513). In this embodiment, the selected tasks are referred to as a first task set. The channel numbers of all the tasks of the first task set are different. In one embodiment, the read status of each of the tasks of the first task set is the specific status b or c. In other embodiments, the read status of one of the tasks of the first task set is different from the read status of another of the tasks of the first task set.

Taking FIG. 3 as an example, assume that the processor selects the tasks 1-3 as a first task set. For the tasks 1 and 2, since the read status of each of the tasks 1 and 2 is the specific status b, the processor reads at least one of the non-volatile memories to retrieve at least one logical-to-physical address mapping table relating to the logical addresses of the tasks 1 and 2. Then, the processor updates the read status of each of the tasks 1 and 2 to the specific status c and updates the channel number of each of the tasks 1 and 2 according to the retrieved logical-to-physical address mapping table.

Next, for the task 3, since the read status of the task 3 is the specific status c, the processor reads at least one of the non-volatile memories to retrieve data relating to the logical address of the task 3. After the data is retrieved, the processor updates the read status of the task 3 to the specific status d. FIG. 4 shows an embodiment of a status table after the first task set has been performed.

After the read status of each of the tasks of the first task set has been updated, the processor determines whether each of the read statuses recorded in the status table shown in FIG. 4 is the specific status d. When each of the read statuses recorded in the status table shown in FIG. 4 is the specific status d, it means that the read command of the command queue has been finished by the processor (step S515). Therefore, the processor outputs all data to a host device. When each of the read statuses recorded in the status table shown in FIG. 4 is not the specific status d, step S513 is executed to select and simultaneously perform many tasks recorded in the status table shown in FIG. 4. At this time, the selected tasks serve as a second task set.

The processor performs all the tasks of the second task set and updates the read status of each of the tasks of the second task set. After all the tasks of the second task set have been finished by the processor, if the read status of one task of the second task set is not the specific status d, the processor again selects many tasks to serve as a third task set and simultaneously executes the tasks of the third task set until the read status of each of the tasks 1~8 of the status table shown in FIG. 4 is the specific status d.

The processor performs many tasks of different task sets during different read periods. In one embodiment, during each read period, all channels are busy. When the read status of each of the tasks 1~8 of the status table shown in FIG. 4 is the specific status d, the processor outputs data relating to the logical addresses of the tasks 1~8 to the host device. In this case, the processor does not output any logical-to-physical address mapping table to the host device.

In one embodiment, the read statuses of all the tasks of the second task set are the same. The read statuses of all the tasks of the second task set may be the same or different from the read statuses of all the tasks of the first task set. In another embodiment, the second task set has a first specific task and a second specific task, wherein the read status of the first specific task is different from the read status of the second specific task. In this case, the processor is capable of simultaneously reading the table (e.g. the logical-to-physical address mapping table) and data.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory device, comprising:
    a plurality of non-volatile memories;
    a volatile memory comprising a command queue; and
    a processor accessing the non-volatile memories via a plurality of channels and generating a status table according to at least one command of the command queue, wherein the status table records a plurality of tasks, a plurality of read statuses, and a plurality of channel numbers, and each task corresponds to one read status and one channel number,
    wherein the generating includes the processor determining whether a logical address of a first specific task of a first task set has been recorded in a specific logical-to-physical address mapping table stored in the volatile memory,
        wherein responsive to determining that the logical address of the first specific task is not recorded in the specific logical-to-physical address mapping table, the processor sets a read status of the first specific task to match a predetermined status,
        wherein responsive to determining that the logical address of the first specific task has been recorded in the specific logical-to-physical address mapping table, the processor sets the read status of the first specific task to match a second predetermined status,
    wherein the processor selects a first group of tasks, each task with a different channel number than other tasks of the first group of tasks, the selecting based on the status table's recorded plurality of tasks and their corresponding channel numbers, the first group of tasks to serve as the first task set,
    wherein the processor simultaneously performs all the specific tasks of the first task set, and wherein the channel numbers corresponding to the specific tasks of the first task set are different,
    wherein responsive to the read status of the first specific task of the first task set matching the first predetermined status, the processor reads one of the non-volatile memories to retrieve a logical-to-physical address mapping table relating to the logical address of the first specific task, and responsive to the read status of the first specific task matching the second predetermined status, the processor reads one of the non-volatile memories to retrieve data relating to the logical address of the first specific task.

2. The memory device as claimed in claim 1, wherein during a first read period, the processor performs all the specific tasks of the first task set, and wherein the read status of each of the specific tasks of the first task set is a first specific status;
    during a second read period, the processor selects a second group of tasks, each task with a different channel number than other tasks of the second group of tasks, the selecting based on the status table's recorded plurality of tasks and their corresponding channel numbers, the second group of tasks to serve as a second task set, and the processor simultaneously performs all the specific tasks of the second task set, and wherein the channel numbers corresponding to the specific tasks of the second task set are different, the read status of each of the specific tasks of the second task set is a second specific status different from the first specific status.

3. The memory device as claimed in claim 2, wherein responsive to the first specific status matching the first predetermined status and the second specific status matching the second predetermined status, after the processor performs the first task set, the processor updates the read status of each of the specific tasks of the first task set to match the second predetermined status, and after the processor performs the second task set, the processor updates the read status of each of the specific tasks of the second task set to a third specific status indicating that the second task set has been finished by the processor.

4. The memory device as claimed in claim 2, wherein responsive to the first specific status matching the second predetermined status and the second specific status matching the first predetermined status, after the processor performs the first task set, the processor updates the read status of each of the specific tasks of the first task set to a third specific status indicating that the first task set has been finished by the processor, and after the processor performs the second task set, the processor updates the read status of each task of the second task set to match the second predetermined status.

5. The memory device as claimed in claim 4, wherein during a third read period, the processor selects a third group of task, each task with a different channel number than other tasks of the third group of tasks, the selecting based on the status table's recorded plurality of tasks and their corresponding channel numbers, the third group of tasks to serve as a third task set, and the processor simultaneously performs all the specific tasks of the third task set, and wherein the channel numbers corresponding to the specific tasks of the third task set are different, the read status of each of the specific tasks of the third task set matches the second predetermined status, and after the processor performs all of the specific tasks of the third task set, the processor updates the read status of each of the specific tasks of the third task set to the third specific status, and wherein the processor continuously selects many tasks among the tasks until each of the read statuses of the tasks is the third specific status.

6. The memory device as claimed in claim 1, wherein the processor simultaneously performs the first specific task and a second specific task of the first task set, and the read status of the first specific task is different from the read status of the second specific task.

7. The memory device as claimed in claim 6, wherein responsive to the processor performing the first specific task, the processor reads a logical-to-physical address mapping table stored in a first non-volatile memory among the non-volatile memories,
wherein responsive to the processor performing the second specific task, the processor reads a specific data stored in a second non-volatile memory among the non-volatile memories, and
wherein the memory device outputs the specific data to a host device, and the memory device does not output the logical-to-physical address mapping table to the host device.

8. The memory device as claimed in claim 1, wherein the specific logical-to-physical address mapping table stored in the volatile memory records a plurality of logical addresses and a plurality of physical addresses relating to the logical addresses.

9. The memory device as claimed in claim 1, wherein during a read period, the processor utilizes all channels to read the non-volatile memories.

10. A data read method applied to a memory device comprising a plurality of non-volatile memories, a volatile memory and a processor, wherein the processor reads the non-volatile memories via a plurality of channels, comprising:
generating a status table according to at least one command of a command queue, wherein the status table records a plurality of tasks, a plurality of read statuses, and a plurality of channel numbers, and each task corresponds to one read status and one channel number, wherein the step of generating the status table according to at least one command of the command queue includes that the processor determines whether a logical address of a first specific task of a first task set has been recorded in a specific logical-to-physical address mapping table stored in the volatile memory,
wherein responsive to determining that the logical address of the first specific task is not recorded in the specific logical-to-physical address mapping table, the processor sets a read status of the first specific task to match a predetermined status,
wherein responsive to determining that the logical address of the first specific task has been recorded in the specific logical-to-physical address mapping table, the processor sets the read status of the first specific task to match a second predetermined status;
selecting a first group of tasks according to the plurality of tasks and the corresponding channel numbers recorded in the status table, wherein each task of the first group of tasks corresponds to a different channel number than other tasks of the first group of tasks, and the first group of tasks is to serve as a first task set;
simultaneously performing all the specific tasks of the first task set, wherein the channel numbers of all the specific tasks of the first task set are different;
reading at least one of the non-volatile memories to retrieve a logical-to-physical address mapping table relating to the logical address of the first specific task of the first task set responsive to the read status of the first specific task matching the first predetermined status;
reading at least one of the non-volatile memories to retrieve data relating to the logical address of the first specific task responsive to the read status of the first specific task matching the second predetermined status.

11. The data read method as claimed in claim 10, wherein during a first read period, all the specific tasks of the first task set are performed, and wherein the read status of each of the specific tasks of the first task set is a first specific status; during a second read period, a second group of tasks is selected according to the plurality of tasks and the corresponding channel numbers recorded in the status table, wherein each task of the second group of tasks is with a different channel number than other tasks of the second group of tasks, the second group of tasks is to serve as a second task set and the specific tasks of the second task set are simultaneously performed, and wherein the channel numbers corresponding to all the specific tasks of the second task set are different, the read status of each of the specific tasks of the second task set is a second specific status different from the first specific status.

12. The data read method as claimed in claim 11, wherein responsive to the first specific status matching the first predetermined status and the second specific status matching the second predetermined status, after all the specific tasks of the first task set have been performed, the read status of each of the specific tasks of the first task set is updated to match the second predetermined status, and after all the specific tasks of the second task set have been performed, the read status of each of the specific tasks of the second task set is updated to a third specific status indicating that the second task set has been finished by the processor.

13. The data read method as claimed in claim 11, wherein responsive to the first specific status matching the second predetermined status and the second specific status matching the first predetermined status, after all the specific tasks of the first task set have been performed, the read status of each of the specific tasks of the first task set is updated to a third specific status indicating that all the specific tasks of the first task set have been finished, and after all the specific tasks of the second task set have been performed, the read status of each of the specific tasks of the second task set is updated to match the second predetermined status.

14. The data read method as claimed in claim 13, wherein during a third read period, a third group of tasks is selected according to the plurality of tasks and the corresponding channel numbers recorded in the status table, each task of the third group of tasks is with a different channel number than other tasks of the third group of tasks, the third group of tasks is to serve as a third task set, and all the specific tasks of the third task set are simultaneously performed, and wherein the channel numbers of all the specific tasks of the third task set are different, the read status of each of the specific tasks of the first task set matches the second predetermined status, and after all the specific tasks of the third task set have been performed, the read status of each of the specific tasks of the first task set is updated to the third specific status, and wherein the other tasks whose read statuses are not the third specific status are performed until each of the read statuses of the tasks is the third specific status.

15. The data read method as claimed in claim 10, wherein the first task set at least comprises the first specific task and a second specific task, and the read status of the first specific task is different from the read status of the second specific task.

16. The data read method as claimed in claim 15, wherein during the performance of the first specific task, a logical-to-physical address mapping table stored in a first non-volatile memory among the non-volatile memories is retrieved, during the performance of the second specific task, a specific data stored in a second non-volatile memory among the non-volatile memories is retrieved and output to a host device, and wherein the logical-to-physical address mapping table is not output to the host device.

17. The data read method as claimed in claim 10, wherein the specific logical-to-physical address mapping table records a plurality of logical addresses and a plurality of physical addresses relating to the logical addresses.

18. The data read method as claimed in claim 10, wherein during a read period, each channel is busy.

* * * * *